(12) United States Patent
Smith, III

(10) Patent No.: US 6,685,201 B1
(45) Date of Patent: Feb. 3, 2004

(54) ROAD LUGE

(76) Inventor: Charles T. Smith, III, P.O. Box 1444, Rogue River, OR (US) 97537

( * ) Notice: Subject to any disclaimer, the term of this patent is extended or adjusted under 35 U.S.C. 154(b) by 658 days.

(21) Appl. No.: 09/046,797

(22) Filed: Mar. 23, 1998

(51) Int. Cl.[7] .................................................. B62M 1/00
(52) U.S. Cl. .................................. 280/87.01; 280/288.1
(58) Field of Search ........................ 280/87.01, 87.021, 280/87.042, 12.1, 32.6, 62, 288.1, 87.1, 786

(56) References Cited

U.S. PATENT DOCUMENTS

| | | | | |
|---|---|---|---|---|
| 3,355,184 A | * | 11/1967 | Green ...................... | 280/11.19 |
| 3,663,038 A | * | 5/1972 | Hendricks ................... | 280/218 |
| 3,913,929 A | * | 10/1975 | Matsuura ................... | 280/7.14 |
| 4,145,064 A | * | 3/1979 | Carn ........................ | 280/87.01 |
| 4,323,258 A | | 4/1982 | Culpeper | |
| 4,336,952 A | * | 6/1982 | Rochman ................. | 280/87.01 |
| 4,384,731 A | | 5/1983 | Webb | |
| 4,548,421 A | * | 10/1985 | Wiener ........................ | 280/281 |
| 4,592,563 A | * | 6/1986 | Dean et al. .................. | 280/253 |
| 4,773,663 A | | 9/1988 | Sawyer et al. | |
| 4,796,907 A | * | 1/1989 | Geller ................... | 280/93.504 |
| 4,993,733 A | | 2/1991 | Eilers | |
| D332,977 S | | 2/1993 | Huffman et al. | |
| 5,263,732 A | | 11/1993 | Harmeyer | |
| 5,354,081 A | * | 10/1994 | Huffman et al. ......... | 280/87.01 |
| 5,354,084 A | * | 10/1994 | Lofgren et al. ............. | 280/250 |
| 5,544,906 A | | 8/1996 | Clapper | |
| 5,785,330 A | * | 7/1998 | Shoquist .................... | 280/81.6 |
| 5,915,707 A | * | 6/1999 | Steffen .................... | 280/87.03 |

OTHER PUBLICATIONS

Brendan I. Koerner, "Extreme", U.S. News & World Report, pp. 52–60 (Jun. 30, 1997).

* cited by examiner

*Primary Examiner*—Paul N. Dickson
*Assistant Examiner*—David R. Dunn

(57) ABSTRACT

A road luge includes an elongated frame having a front end and a back end, a strut extending rearwardly and upwardly from the back end of the frame, a back axle supported on the strut and fixed in orientation relative to the frame, and a single back wheel rotationally mounted on the back axle along the centerline axis of elongation of the frame. The road luge has a front assembly attached to the frame at a location adjacent to the front end of the frame. The front assembly includes two rotationally mounted and steerable front wheels, with one front on either side of the frame. The road luge has a reclining body rest supported on the frame, so that a rider may recline on the body rest with the rider's torso in a substantially horizontal position, and with the rider's feet extending toward the front end of the frame, and the rider's head angled upwardly so as to permit vision toward the front end of the frame.

19 Claims, 4 Drawing Sheets

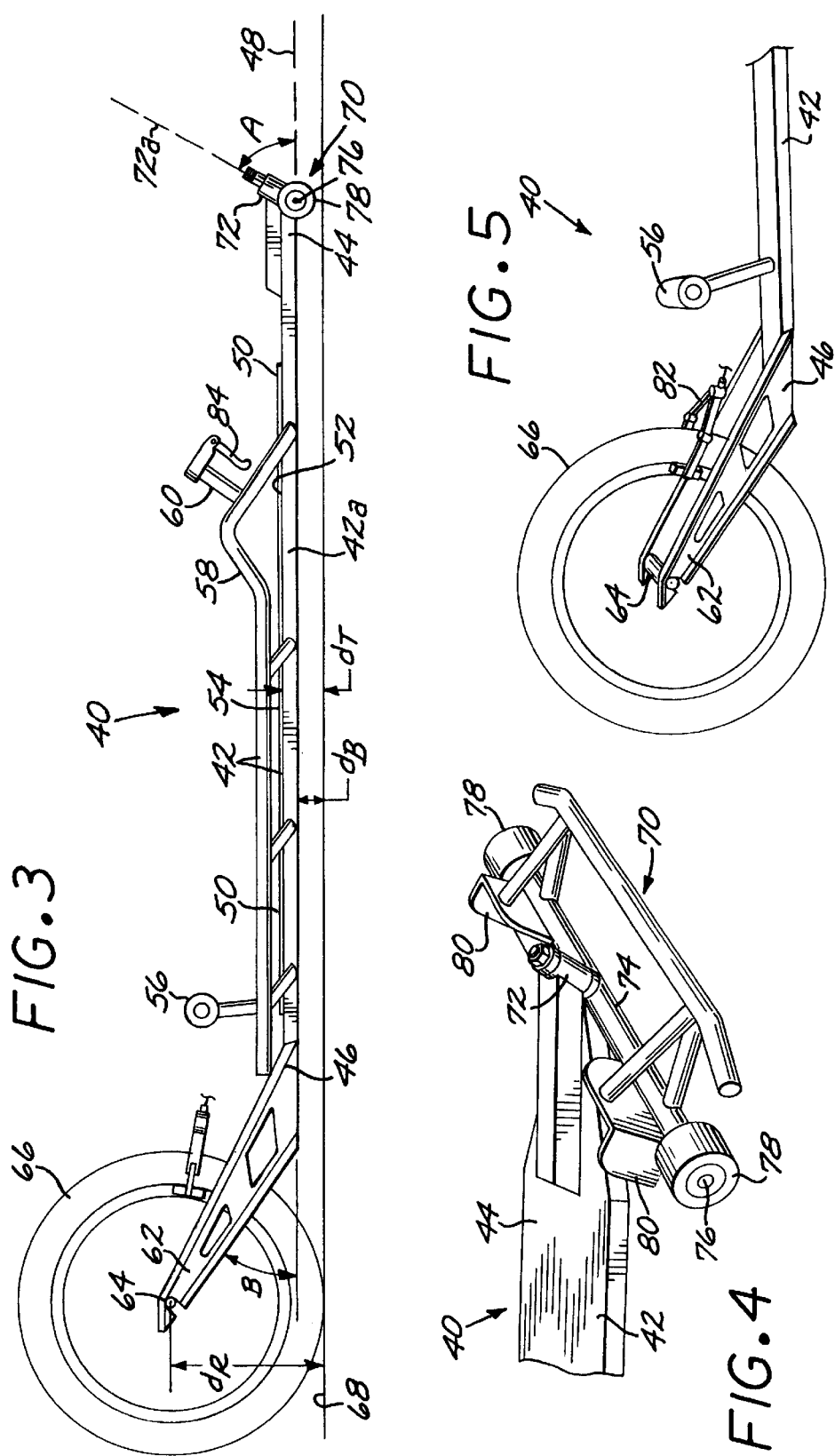

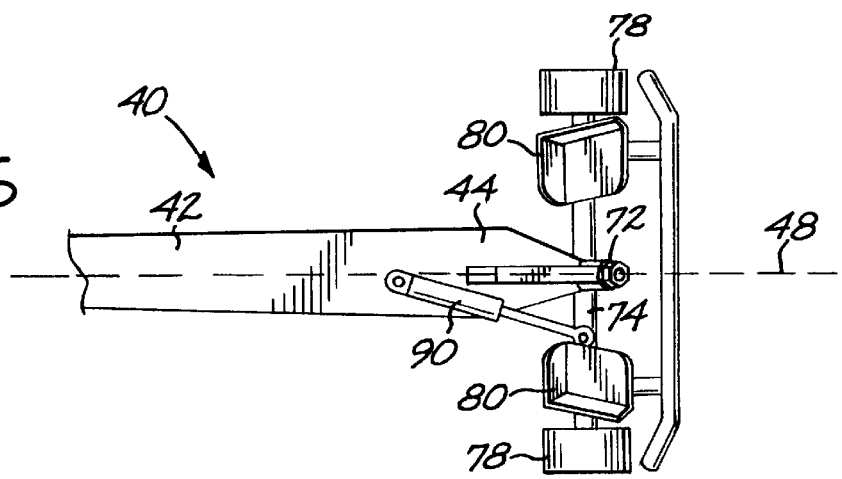
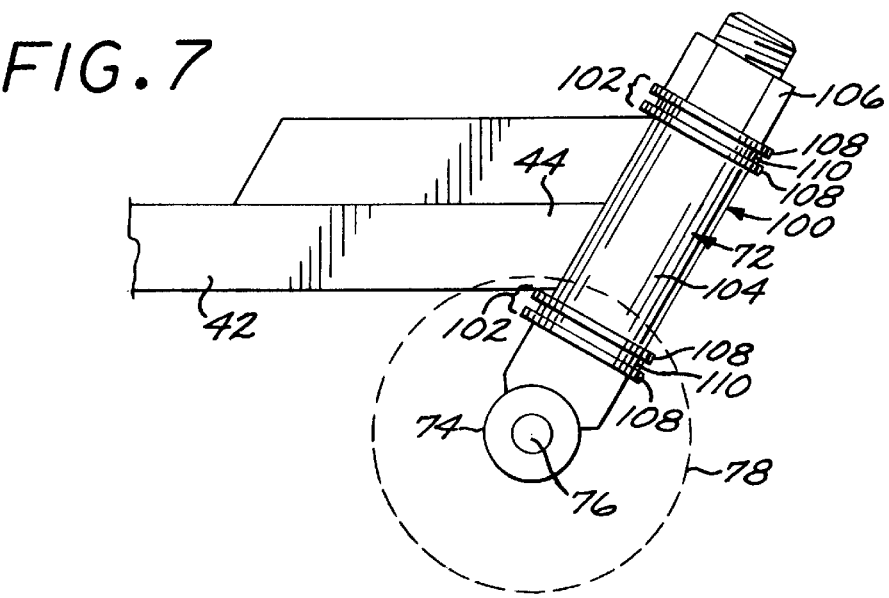
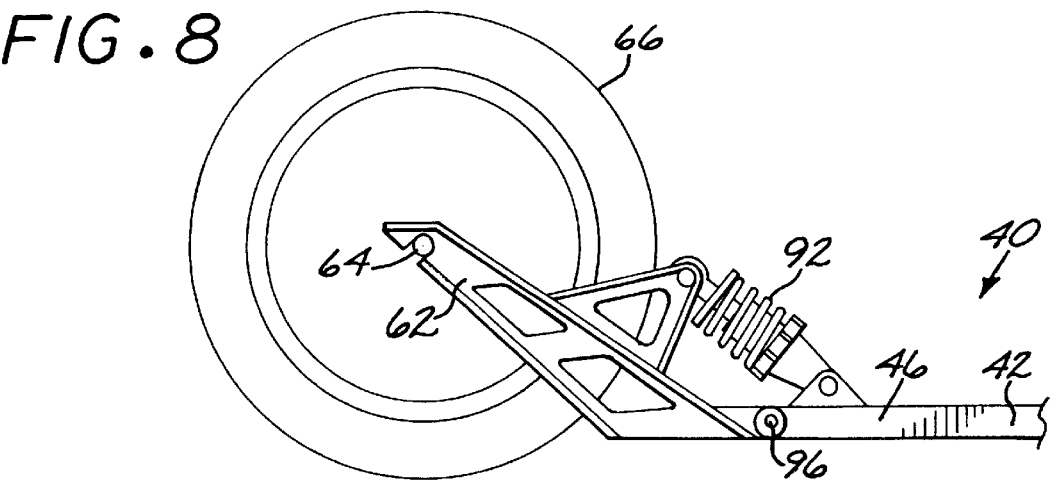

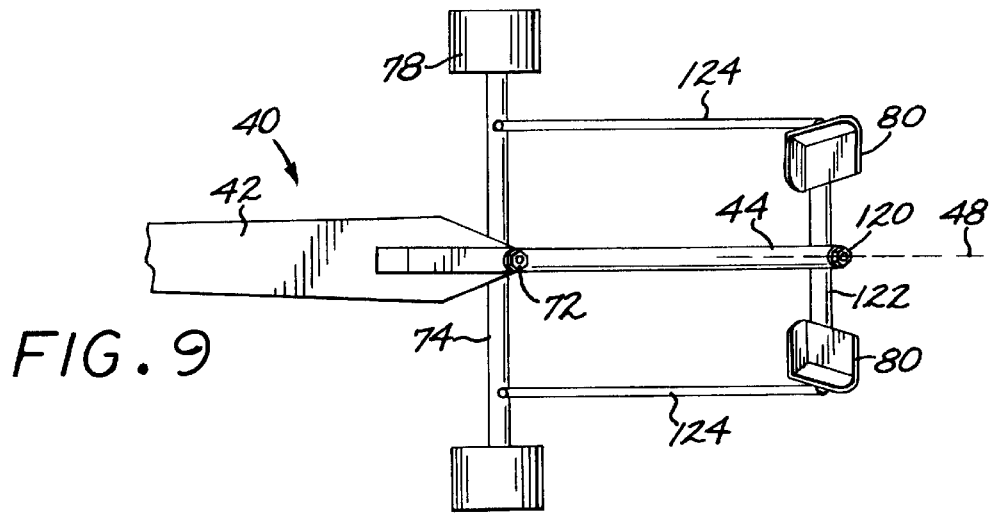
FIG. 9
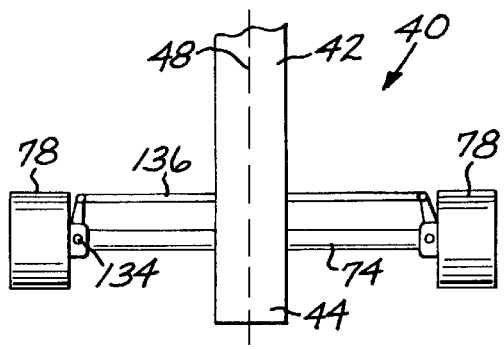
FIG. 10A
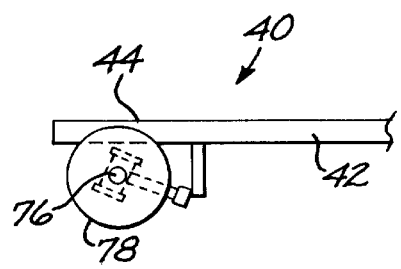
FIG. 10B
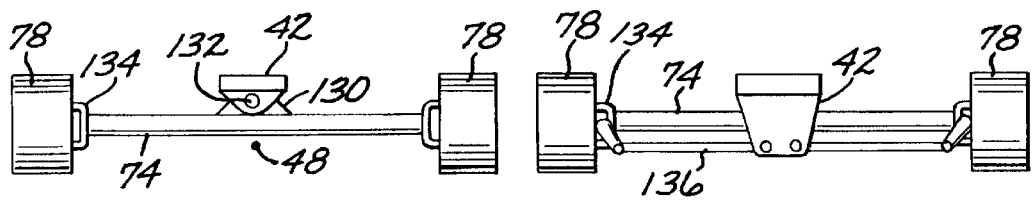
FIG. 10C
FIG. 10D

ROAD LUGE

BACKGROUND OF THE INVENTION

This invention relates to a wheeled, one-person vehicle, and, more particularly, to a road luge.

A snow luge is a one-person, unpowered sled having a light-weight frame and snow runners. The snow luge is designed so that the rider reclines on the frame of the snow luge with the feet extending forwardly. The snow luge is typically used in timed race events run down an icy, trough-type track with banked sides. Snow luges have long been popular in winter sports.

To extend the training period and enjoyment of the snow luge to the summer months and to those areas which get little snow, the road luge was developed. In its most basic form, the road luge replaces the snow runners of the snow luge with wheels, so that the road luge may operate by rolling downhill on pavement. In the most commonly used road luge, a pair of wheels is supported on pivoting axles at each of the front and back ends of an elongated frame, upon which the rider reclines.

Because the road luge does not ride in a fixed track in the manner of a snow luge, there must be a convenient approach for steering the path of the road luge. In the usual approach, neither pair of wheels is directly steerable. Instead, steering is accomplished as the rider leans into the turn and the pairs of wheels naturally pivot to follow the banking of the road luge. The front pair of wheels and their front axle pivot toward the turn, and the rear pair of wheels and their rear axle pivot away from the turn, leading to a tendency for the rear end of the road luge to skid outwardly during the turn. Even in those cases where the front wheels are directly steerable, the rear wheels pivot away from the turn and tend to skid. Inasmuch as steering is accomplished primarily by the shifting of the weight of the rider, errors in steering may often be made which cause the inside or outside wheels to lift off the ground, reducing the contact of the wheels to the pavement and leading to a loss of traction and directional stability in turns. The braking of the conventional road luge is accomplished by the dragging of the rider's feet on the ground. Consequently, the rider feels somewhat insecure when turning the road luge at speed, because of a well-founded perception of lack of stability, a tendency for the rear end to skid outwardly and the road luge to spin out of the turn, and an inability to brake the road luge after it has entered a turn.

The result is that the maximum speed of the road luge on curved courses is limited by the concern of the rider for stability. The popularity of the road luge is also adversely affected by its perceived and actual lack of stability, because many potential users view the road luge as requiring a "daredevil" attitude.

There is a need for an improved design for a road luge which is more stable and steerable than available road luges. The present invention fulfills this need, and further provides related advantages.

SUMMARY OF THE INVENTION

The present invention provides a road luge which is extremely stable in both straight-line and turning conditions at low and high speeds. Steering is accomplished by directly steering the front wheels, accompanied by a natural shifting of the weight of the body of the rider. Direct steering of the wheels and the proper shifting of weight improves the ability to steer the road luge through curved courses, without errors resulting from the overshifting or undershifting of weight as in conventional road luges. There is little if any tendency for the rear end of the road luge to skid outwardly during turns. All of the wheels remain in contact with the ground, both in straight-line and turning movement. Prototypes of the road luge have reached speeds of 80 miles per hour in downhill testing with excellent actual and perceived stability on straight and curved courses.

In accordance with the invention, a road luge used by a reclining rider comprises an elongated frame having a front end and a back end, a back axle supported from the back end of the frame and fixed in orientation relative to the frame, and a single back wheel rotationally mounted on the back axle along a longitudinal centerline of the frame. A front assembly is attached to the frame at a location adjacent to the front end of the frame. The front assembly includes two rotationally mounted and steerable front wheels, with one front wheel on each side of the frame. A body rest is supported on the frame, so that the rider may recline to a substantially horizontal position on the body rest with the rider's feet extending toward the front end of the frame. The body rest is preferably relatively positioned to the back axle such that a center of gravity of the reclining rider is below the back axle. A steering dampener and/or a back-suspension dampener, operable to damp vibrations transmitted through the back wheel, may be provided.

In one preferred embodiment, the front assembly comprises an axle pivot attached to the frame, a front axle support fixed to the axle pivot and pivotable relative to the frame on the axle pivot, and a front axle mounted in the front axle support, with the two front wheels rotationally mounted on the front axle. Preferably, the axle pivot has a pivot axis lying in the vertical plane and oriented at a forwardly inclined axle pivot angle to the horizontal of from about 48 to about 60 degrees. Inclining the pivot angle forwardly improves the stability of the road luge in turns by causing the body of the rider to lean into the turn by the proper amount. The front axle is desirably steerable with foot rests on the front axle support. The back wheel is preferably relatively large in diameter, allowing the back axle to be above the rider's center of gravity and also permitting the use of a bicycle-type brake that is actuatable by the rider.

In another embodiment, the front assembly comprises a front axle hinge having a hinge pivot axis lying in the horizontal plane and oriented parallel to the longitudinal centerline of the frame. A front axle support is hingedly attached to the frame through the front axle hinge, and a front axle is mounted in the front axle support, with the pair of front wheels rotationally and pivotably mounted on the front axle. A linkage causes the wheels to pivot when the rider leans the frame to one side by shifting body weight.

The road luge of the invention substantially increases the stability of this type of vehicle. Both the actual and perceived stability are improved over prior designs, allowing the road luge to be operated at higher speeds. The present design features are preferably applied to an unpowered vehicle, but may also be applied in various combinations to powered vehicles of a similar type. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is an elevational view of the road luge of FIG. 2;

FIG. 4 is a detail perspective view of the front assembly of the road luge of FIG. 2;

FIG. 5 is a detail elevational view of the back end of the road luge of FIG. 2;

FIG. 6 is a plan view of a front end detail of another embodiment of the road luge of FIG. 2;

FIG. 7 is an elevational view of an adjustable dampener pivot;

FIG. 8 is an elevational view of a back end detail of another embodiment of the road luge of FIG. 2;

FIG. 9 is a plan view of another embodiment of the front assembly; and

FIGS. 10A–10D are, respectively, a plan view, a side elevational view, a front elevational view, and a back elevational view of another embodiment of the front assembly.

DETAILED DESCRIPTION OF THE INVENTION

Figure 1:
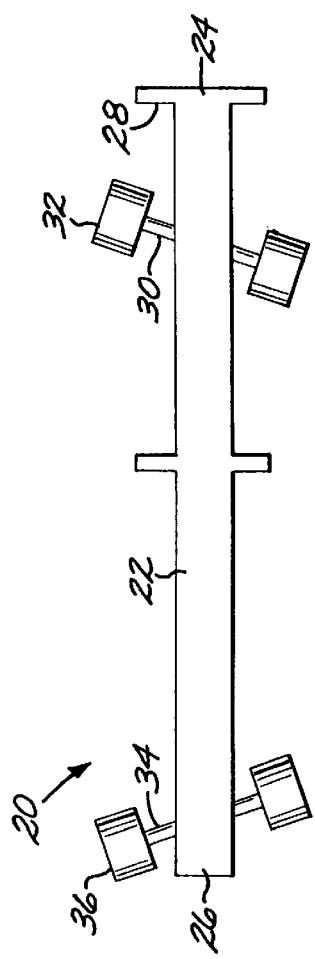
FIG. 1 is a plan view of a conventional road luge with pivoting front and rear axles.

FIG. 1 depicts a conventional road luge 20. The road luge 20 includes a frame 22 with a front end 24 and a back end 26. A foot rest 28 is located at the front end 24. Mounted to the frame 22 toward its front end 24 is a front axle 30 that is pivotably joined to the frame 22, and has a front wheel 32 at each end thereof. The front axle is usually 12 inches long or less. The front axle 30 may be directly steerable by the rider or not directly steerable. As used herein "directly steerable" means that the rider initiates turns by causing the axle to pivot about the frame, as with a steering linkage or a rope, or with foot pressure against the axle or axle support. Although road luges have been built that have a directly steerable front axle, the highest performance conventional road luges do not have a directly steerable front axle because of its placement. As illustrated, the front axle in these high-performance conventional road luges is positioned about ⅓ of the way from the front end 24 toward the back end 26, so that it is approximately positioned beneath the buttocks and lower back of the reclining rider. This positioning loads a high percentage of the body weight of the rider onto the front axle 30 and front wheels 32, improving the steering of the road luge 20 in turns. It has been observed that placement of the front axle of the road luge closer to the front end of the frame, so that more of the rider's weight is loaded onto the rear axle and wheels, substantially reduces the turning stability in corner. When the front axle is located about ⅓ of the way from the front end 24 toward the back end 26, as in the conventional high-performance road luges, direct steering of the short front axle 30 is difficult or impossible. In the usual case where the axle is not directly steerable, the rider initiates turns by leaning the body in the direction of the turn and can easily make over-leaning or under-leaning errors in this steering.

At or near the back end 26 of the conventional road luge 20 is a back axle 34 that is pivotably joined to the frame 22, and has a back wheel 36 at each end thereof. The back wheels 36, like the front wheels 32, are small in diameter, and are typically skate board wheels which are 2–4 inches in diameter. The back axle 34 is typically not directly steerable. The rider reclines on the top side of the frame 22. Because both axles 30 and 34 are below the top side of the frame 22, the center of gravity of the rider is necessarily above both of these axles, leading to a degree of incipient side-to-side, tilting instability. When the road luge 20 is turned, to the right in FIG. 1, the front axle 30 pivots in the direction of the turn and the back axle 34 pivots away from the turn. This pivoting of the back axle 34 away from the turn leads to a tendency for the back end to skid away and an instability of the road luge during the turning.

FIGS. 2–10 illustrate road luges 40 according to the present invention. The road luge 40 includes a frame 42 having a front end 44 and a back end 46. The frame 42 is elongated parallel to a centerline longitudinal axis of elongation 48 which extends along a lateral centerline of the frame 42. In the illustrated embodiment, the main structural member 42a of the frame 42 is a 6 foot long rectangular steel tube about 1 inch high, 3 inches wide, and of 0.120 inch wall thickness. The main structural member 42a was made of mild steel in the inventor's prototype, but other materials of construction may be used, such as, for example chromium-molybdenum steel, titanium alloys, and carbon-fiber-reinforced, epoxy composite materials. The main structural member 42a need not be tubular, but may be of any operable shape. A padded reclining body rest 50 extends over a top side 52 of the rearward portion of the frame 42. The body rest 50 includes a horizontal padded portion 54 to receive the rider's torso and a padded head rest 56 that is angled upwardly to elevate the head of the rider upwardly so that the rider may see toward the front end 44 of the frame 42. The rider reclines on the body rest 50 with the rider's feet extending forwardly toward the front end 44.

Side bars 58 aid in preventing the rider's torso from rolling to either side off the padded portion 54 and also support handles 60 that extend outwardly and upwardly on either side of the frame 42 and that are located so as to be easily gripped by the rider. In the illustrated embodiment, the side bars are made of ½ inch diameter, schedule 40 steel pipe, and are welded to the main structural member of the frame. Other materials of construction, such as discussed above, may also be used. The side bars 58 serve the additional function of out-of-horizontal-plane trusses to increase the rigidity and reduce the flexure of the frame under the weight of the rider, both statically and dynamically as the road luge is ridden.

Figure 2:
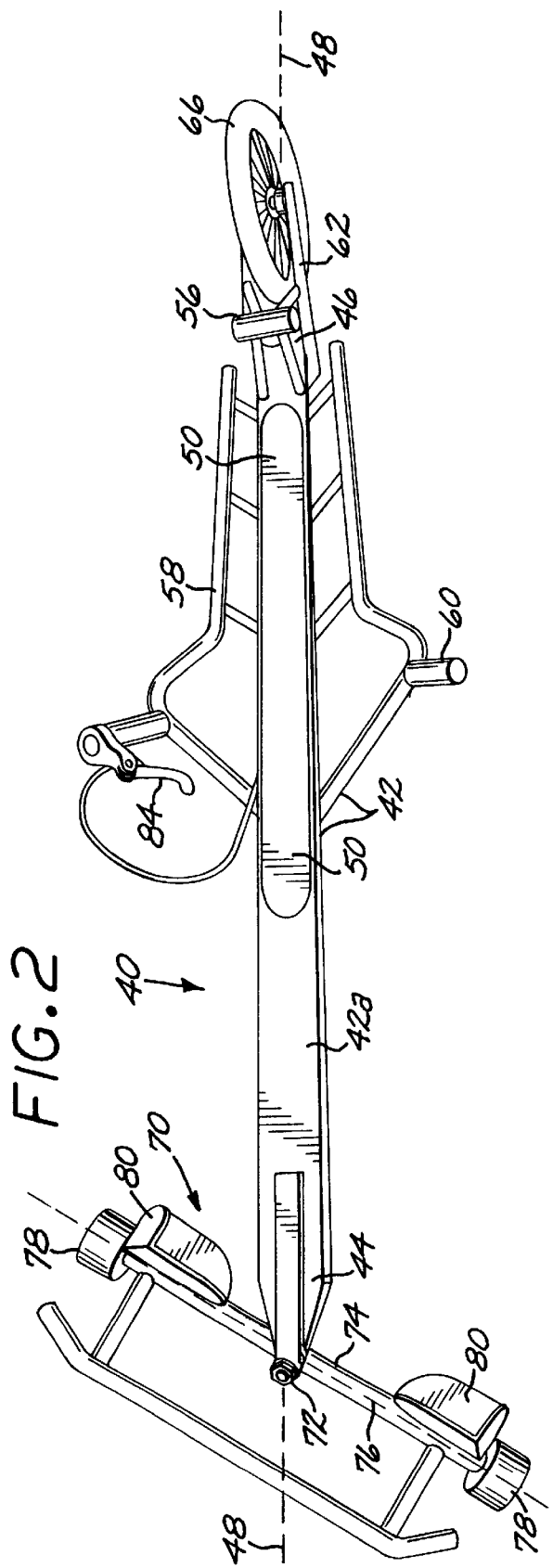
FIG. 2 is a plan view of a road luge according to the present invention.

A strut 62 extends rearwardly and upwardly from the back end 46 of the frame 42, as seen in FIGS. 2, 3, and 5. The strut 62 is preferably forked in the manner of the front strut of a conventional bicycle, although a single-sided strut may be used if it is sufficiently structurally rigid. The strut 62 is inclined rearwardly and upwardly at an angle B (FIG. 3) to the horizontal plane of the ground of from about 25 to about 40 degrees, preferably about 35 degrees. A back axle 64 is supported on the distal end of the strut 62 between the fork arms of the strut 62. The back axle 64 is horizontal and extends transversely to the axis of elongation 48, is fixed in orientation, and does not pivot. A single back wheel 66 is rotationally mounted on the back axle 64 between the two arms of the strut, and along the centerline axis of elongation 48. The back wheel 66 is relatively large in diameter. Preferably, the back wheel 66 is from about 12 inches to about 26 inches in diameter, most preferably about 20 inches in diameter. A spoked bicycle wheel of this latter diameter was used in the prototype.

The use of the large-diameter back wheel 66 and the elevating strut 62 raises the back axle 64 to a distance $d_R$ well above the horizontal plane level of the ground 68 and the top side 52 of the frame 42. The bottom of the frame 42 is at a distance $d_B$ above the ground 68 and the top side of the frame 42 (i.e., the horizontal portion 54 of the body rest 50) is at a distance $d_T$ above the ground 68. In a working prototype built and tested by the inventor, $d_R$ was about 10 inches, $d_T$ was about 2½ inches, and $d_B$ was about 1½ inches. With these relationships, the center of gravity of the rider, located at approximately the through-thickness middle of the torso of the reclining rider, was about 7 inches above the ground in the case of the inventor, and is approximately the same for other riders. The center of gravity of the rider was therefore below the back axle 64. The inventor has found that this relationship—the center of gravity of the rider below the back axle—promotes good stability of the road luge 40 in both straight-line and turning movements.

Because there is only the single back wheel 66 that does not pivot during turns and is made to track through turns in the manner of the back wheel of a motorcycle, there is no tendency for the back wheel to slide outwardly in turns. The back end 46 of the road luge 40 therefore tracks the turn much more accurately than does the back end 26 of a conventional road luge 20.

FIGS. 2, 3, and 4 illustrate a first embodiment of a front assembly 70 pivotably attached to the front end 24 of the frame 42. The front assembly 70 includes an axle pivot 72 attached to the front end 24 of the frame 42 and whose axis of pivoting 72a is oriented in the vertical plane. The axis of pivoting 72a of the axle pivot 72 is inclined at an axle pivot angle A to the centerline axis of elongation 48, which lies in the horizontal plane when the wheels of the road luge are resting on the ground in its normal operating position. A front axle support 74 is fixed to the axle pivot 72 and is pivotable relative to the frame 42 on the axle pivot 72. The front axle support 74 extends transversely on each side of the frame 42. A front axle 76 is mounted in the front axle support 74, and a pair of front wheels 78 are rotationally mounted on the front axle 76, one at each end of the front axle 76 on either side of the frame 42 and the centerline axis of elongation 48. The two front wheels 78 are normally smaller in size than the single back wheel 66, inasmuch as the front axle 76 is at about the same level as the frame 42 and the practical maximum size of the front wheels 78 is limited by the possibility of their contacting to the leg of the rider as the front axle 76 is pivoted during turns. (An embodiment illustrated in FIGS. 10A–D, and which will be discussed subsequently, allows the use of larger front wheels, if desired.) The front wheels 78 are preferably from about 2½ inches in diameter to about 8 inches in diameter. In the prototype, the front axle 76 was about 20 inches long, and the front wheels 78 were each 4-inch diameter skate board wheels with an ABEX bearing rating of 5–7.

A pair of steering foot rests 80 are positioned on the front axle support 74 just inboard of the front wheels 78, one on each side of the axle pivot 72. The rider rests the feet on these foot rests 80 when riding the road luge 40, keeping the front axle 76 perpendicular to the centerline axis of elongation 48 to steer a straight course. To turn, the rider uses the foot rests 80 to urge the front axle 76 to pivot in the direction of the turn. The present road luge is therefore "directly steerable".

The angle A is preferably from about 48 degrees to about 60 degrees, most preferably about 50 degrees. This preferred forward inclination of the axle pivot 72 by an acute angle A further aids in maintaining the stability of the road luge 40, particularly as it turns. By inclining the axle pivot forwardly, the weight of the rider is automatically shifted toward the inside of the turn during turning, causing the road luge 40 to lean into the turn. It has been found that if the angle A is greater than about 60 degrees, there is insufficient leaning of the weight of the rider into the turn, so that it is difficult to turn through sharp corner. If the angle A is less than about 48 degrees, there is a tendency for over-leaning of the body of the rider during turns at slow speeds. As a result, it becomes difficult to return to a straight line course after the turn is complete, because the rider must use his leg strength of one leg only to return the frame to the upright position. For some riders, the required leg strength is too great for comfortable riding. However, the angle A may be higher or lower than the specified range of from about 48 to about 60 degrees, and as high as 90 degrees. Such a road luge is operable although less optimal in configuration and performance.

The manner of steering of the present road luge is to be contrasted with that of the most popular conventional road luges, where the front wheels are not directly steerable but do pivot during a turn. With this conventional road luge, the rider initiates the turn by shifting the body weight to lean into the turn. In the present road luge, the rider initiates the turn by using the feet acting through the foot rests 80 to cause the front axle to pivot. The body weight of the rider is shifted into the turn because of the forward inclination of the axle pivot, by the proper amount as determined mechanically by the structure of the road luge 40. Consequently, achieving a successful turn with the present road luge is not dependent upon the ability of the rider to judge the required amount of weight shifting, which is a difficult task when the rider is in a reclining position. Turning is determined by a conventional steering movement, which is a far more natural movement for most riders. The leaning of the frame by the proper amount also causes the rear wheel to track correctly through the turn, with little tendency to slide out during a turn. The present road luge is therefore far more maneuverable than the conventional road luge.

Both the direct steering and the placement of the center of gravity of the rider below the rear axle independently contribute to the stability of the road luge on a straight line course and in turns. In combination as in the preferred form of the present road luge 40, these features result in a road luge which as high actual stability and, equally important, a high perceived stability and a "solid" feeling.

The use of the large-diameter back wheel 66 also permits the use of a brake 82 (FIG. 5) to directly retard the rotation of the back wheel 66, a feature not available on conventional road luges 20 that utilize four small-diameter wheels. The term "directly retard" means that the braking force is applied directly to the wheel, not somewhere else as in the case of a braking force applied to the ground which then indirectly serves to slow the vehicle. The brake 82 may be of any operable type. Preferably, it is a caliper-type brake used on mountain bikes which acts against the rim of the wheel. A hand-squeeze actuator 84 for the brake 82 is mounted on one of the handles 60 so that it may be easily actuated by the rider, and connected to the brake 82 by a conventional brake cable or hydraulic line. The brake may also be a disk-type brake that may be actuated by the rider.

Because the wheels of the conventional high performance road luge are small in diameter, no suitable braking for the axle or the wheels is available. Instead, such conventional road luges are typically braked by the rider dragging the feet along the pavement to create friction. This braking approach is difficult to apply evenly and uniformly, inasmuch as the riders feet are facing forwardly. Additionally, as the rider enters a corner, the braking by foot-dragging must be applied prior to the point that the conventional road luge enters the corner. If the braking is applied after the conventional road luge enters the corner, there is a tendency for the road luge to spin. The result is that the conventional road luge must be braked too early and conservatively to too low a speed, or the rider risks a spin out if it is discovered during the course of the turn that the road luge is traveling too fast.

By contrast, in the present road luge 40 the braking to the large-diameter back wheel may be applied evenly with a drag to the back wheel. Any braking may be applied before or after the road luge enters the corner, in the case of turning. In many instances, the enhanced stability of the present road luge permits cornering without any braking. However, if the rider finds after the turn starts that the road luge is traveling too fast, the rider may brake the road luge partway through the turn with the brake applied directly to the rear wheel.

The handling and the riding performance of the road luge 40 may optimally be improved for certain uses and tuned to the preferences of the rider, by additions to the front steering and the rear suspension. FIG. 6 illustrates the use of a steering viscoelastic dampener, specifically a steering dampener piston 90 pivotably connected between the frame 42 near its front end 44 and the front axle support 74 of the front assembly 70. The dampener piston 90 is preferably adjustable as to the piston resistance it provides to movement between its ends. This piston resistance becomes a pivoting resistance to the pivoting of the front axle 76, and thence serves to dampen the steering action. The greater the piston resistance and the pivoting resistance, the less "wobble" in the steering but the more force is required to make turns. The rider may adjust the dampener piston 90 according to personal preference, the nature of the roadway, and the type of course to be followed.

FIG. 7 illustrates another approach to damping of the front axle vibration, which is preferred by the inventor. The axle pivot 72 is provided as an adjustable dampener pivot 100 having at least one set (illustrated as two sets) of friction washers 102 locked to a pivot bushing 104 by an adjustable nonslip nut such as a nylock nut 106. One acceptable form of set of friction washers 102 includes two steel washers 108 separated by a nylon washer 110. A preferred form of this dampener pivot (with one set of friction washers 102) is made by Answer Products, Valencia, Calif. The adjustable dampener pivot 100 allows the turning resistance of the front axle 76 to be set to a desired value by turning the nut 106, thereby increasing or reducing the frictional resistance to turning of the axle pivot 72 and simultaneously increasing or reducing wobble-type road vibration transmitted into the frame 42.

FIG. 8 illustrates the use of a back-suspension viscoelastic dampener, specifically a back shock absorber 92 for the back wheel 66. In this embodiment, the strut 62 is hingedly joined by a hinge pivot 96 to the frame 42, rather than rigidly as shown in FIG. 3. The back shock absorber 92, which is preferably adjustable as to its damping characteristics, is connected between the frame 42 and the hinged strut 62. Road vibration that would otherwise be transmitted through the back wheel 66 to the frame 42 and the rider is damped by the back shock absorber 92. The back shock absorber 92 also promotes rear wheel tracking through turns over rough road surfaces by aiding in maintaining the rear wheel 66 in contact with the ground. The rider may adjust the back shock absorber 92 according to personal preference, the nature of the roadway, and the type of course to be followed. A preferred back shock absorber 92 is the model ALPS-4 made by Fox Racing Shox, San Jose, Calif.

FIG. 9 shows another embodiment of the front assembly 70. Elements previously described and used in this embodiment are given the same identifying number as used in the earlier description, which description is incorporated here. In this embodiment, the axle pivot 72, the front axle support 74, and the front wheels 78 (mounted on the front axle, not visible in FIG. 9) are positioned near the front end 44, but spaced back from the front end 44 by an amount that is typically about ⅓ of the length from the front end 44 to the back end 46. In addition, a foot rest pivot 120 is attached to the frame 42 at a location closer to the front end 44 than the axle pivot 72. The foot rest pivot 120 is preferably inclined forwardly at the same angle A as the axle pivot 72. A foot rest support 122 extends generally transversely to the axle 48 in the horizontal plane and is fixed to the foot rest pivot 72 so as to be pivotable relative to the frame 42 on the foot rest pivot 120. The two steering foot rests 80 are mounted to the foot rest support 122, on either side of the frame 42. A pair of tie rods 124 are pivotably connected between the ends of the foot rest support 122 and the front axle support 74 as a linkage. The road luge is steered in substantially the same manner as previously described. In this embodiment of FIG. 9, the front axle support 74 and the wheels 78 may be placed rearwardly of their position as depicted in FIG. 4, and more directly under the back and buttocks of the rider for improved weight distribution. This embodiment reduces the tendency for sideways drifting in very hard turns.

FIGS. 10A–10D illustrate yet another embodiment of the front assembly 70, which uses a different steering principle than that of FIGS. 4 and 9. However, some elements are in common. Elements previously described and used in this embodiment are given the same identifying number as used in the earlier description, which description is incorporated here. In this embodiment, a front axle hinge 130 located near the front end 44 of the frame 42 has a hinge pivot axis 132 lying in the horizontal plane of the ground 68 and oriented parallel to the centerline longitudinal axis of elongation 48. The front axle support 74 is hinged to the frame 42 so that its ends may pivot up and down in the front view of FIG. 10C. There is no forwardly inclined front axle pivot, as in the embodiments of FIGS. 4 and 9. The front wheels 78 are joined to the front axle support by wheel pivots 134. There are two tie arms 136. A first end of each tie arm 136 is pivotably connected to one of the wheel pivots 134, and a second end of each tie arm 136 is pivotably connected to the frame 42.

In this steering approach, the rider leans the body to the side toward which turning is desired. As the frame tilts, the tie arms 136 cause the wheel pivots 134, and thence the front wheels 78, to turn in the direction toward which the rider leaned. The advantage of this approach is that the front axle support 74 does not pivot in the horizontal plane as the road luge is turned. This pivoting in the horizontal plane, such as in the embodiment of FIGS. 2–5, brings the front wheels 78 close to the legs of the reclining rider during the turn, thereby limiting the maximum size of the front wheels. With the embodiment of FIGS. 10A–10D, the front wheels may be made larger if desired, from as little as 2½ inches up to 12 inches or more in diameter, with a drop axle having appropriate height dimensions. Hand-actuated brakes like the brake 82 may be used on these front wheels of larger diameter, as well as on the back wheel.

The inventor has built several prototypes of the road luge 40 of the invention with progressively improved features. The latter prototypes had the dimensions and physical features discussed previously, with the configuration of FIGS. 2–5 and 7. The overall length of the preferred road luge 40 was about 8 feet, 3 inches, and the complete road luge weighed about 45 pounds. The road luge 40 was tested by several persons of various physical statures, so that the inventor could determine the suitability for, stability of, and performance of the road luge with persons of various sizes. The single size frame was found to be comfortable for and operable by persons ranging in weight from 140 to 235 pounds, with excellent straight-line and turning stability. Maximum straight-line speeds of 75–80 miles per hour were achieved by various of the riders who tested the prototype. The road luge 40 was highly stable at low and high speeds, and in straight-line and turning operation. The most-advanced prototype of the road luge of the invention was comparatively raced against conventional road luges of the type illustrated in FIG. 1, over a two-mile curved downhill course. The present road luge was observed to travel through corners substantially faster and more stably than the conventional road luge, and would therefore outdistance the conventional road luge in such racing.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An unpowered road luge, comprising:
   an elongated frame having a front end and a back end;
   a back axle supported from the back end of the frame and fixed in orientation relative to the frame;
   a single back wheel, the single back wheel being rotationally mounted on the back axle along a longitudinal centerline of the frame;
   a front assembly attached to the frame at a location adjacent to the front end of the frame, the front assembly including two rotationally mounted and steerable front wheels, with one front wheel on each side of the frame; and
   a horizontal body rest supported on the frame,
   wherein the road luge is unpowered.

2. The road luge of claim 1, wherein the body rest is relatively positioned to the back axle such that a center of gravity of a rider reclining on the back rest is below the back axle.

3. The road luge of claim 1, wherein the front assembly comprises
   an axle pivot attached to the frame,
   a front axle support fixed to the axle pivot and pivotable relative to the frame on the axle pivot, and
   a front axle mounted in the front axle support, with the two front wheels rotationally mounted on the front axle.

4. The road luge of claim 3, wherein the axle pivot is oriented relative to the frame at a forwardly inclined axle pivot angle.

5. The road luge of claim 4, wherein the forwardly inclined axle pivot angle is from about 48 to about 60 degrees relative to the frame.

6. The road luge of claim 3, wherein the axle pivot comprises an adjustable dampener pivot.

7. The road luge of claim 3, further including
   a pair of steering foot rests on the front axle support, one of the pair of steering foot rests being located on each side of the axle pivot.

8. The road luge of claim 3, further including
   a foot rest pivot attached to the frame at a location closer to the front end of the frame than the axle pivot,
   a foot rest support fixed to the foot rest pivot and pivotable relative to the frame on the foot rest pivot,
   a pair of steering foot rests on the foot rest support, one of the pair of steering foot rests being located on each side of the foot rest pivot, and
   at least one steering tie rod, each steering tie rod being pivotably attached at a first end to the foot rest support and at a second end to the front axle support.

9. The road luge of claim 1, wherein the front assembly comprises
   a front axle hinge having a hinge pivot axis oriented parallel to the longitudinal centerline of the frame,
   a front axle support hingedly attached to the frame through the front axle hinge, and
   a front axle mounted in the front axle support, with the pair of front wheels rotationally and pivotably mounted on the front axle.

10. The road luge of claim 1, further including
    a brake operable to directly retard motion of the back wheel.

11. The road luge of claim 1, further including
    a steering dampener connected between the frame and the front assembly.

12. The road luge of claim 1, further including
    a back-suspension dampener operable to damp vibrations transmitted through the back wheel.

13. The road luge of claim 1, wherein the back wheel has a diameter of from about 12 to about 26 inches.

14. The road luge of claim 1, wherein each of the front wheels has a diameter of from about 2½ inches to about 8 inches.

15. The road luge of claim 1, further including
    a pair of handles, one handle extending upwardly and laterally outwardly from each side of the frame.

16. An unpowered road luge used by a reclining rider, comprising:
    a frame having a front end and a back end, the frame being elongated parallel to a centerline axis of elongation which extends along a longitudinal centerline of the frame;
    a front assembly pivotably attached to the front end of the frame, the front assembly including
       an axle pivot attached to the front end of the frame and oriented at an axle pivot angle to the centerline axis of elongation,
       a front axle support fixed to the axle pivot and pivotable relative to the frame on the axle pivot,
       a front axle mounted in the front axle support, and
       a pair of front wheels rotationally mounted on the front axle, one of the pair of wheels being mounted on each side of the centerline axis of elongation; and
    a horizontal body rest supported on the frame, so that the rider may recline with the rider's torso in a substantially horizontal position on the body rest, with the rider's feet extending toward the front end of the frame, and with the rider's head angled upwardly so as to permit vision toward the front end of the frame;
    a strut extending rearwardly and upwardly from the back end of the frame;
    a back axle, the back axle being supported from the strut and located rearwardly from the body rest, the back axle being fixed in orientation relative to the frame; and
    a single back wheel, the single back wheel being rotationally mounted on the back axle and located rearwardly of the body rest, wherein the road luge is unpowered.

17. The road luge of claim 16, wherein the body rest is relatively positioned to the back axle such that a center of gravity of the reclining rider is below the back axle when the road luge is horizontal.

18. The road luge of claim 17, wherein the axle pivot angle is from about 48 to about 60 degrees.

19. An unpowered road luge used by a reclining rider, comprising:

an elongate frame having a front end and a back end;

a rear suspension assembly at the back end of the elongated frame which permits the elongated frame to tilt in a direction of a turn, the rear suspension assembly including a back axle supported from the back end of the frame and fixed in orientation relative to the frame, and a single back wheel, the single back wheel being rotationally mounted on the back axle along a longitudinal centerline of the frame;

a front assembly including a front axle support affixed to the front end of the frame, a front axle mounted to the front axle support, two rotationally mounted and steerable front wheels mounted to the front axle, with one front wheel on each side of the frame, and a pair of steering root rests affixed to the front axle support; and a horizontal body rest supported on the frame, so that the rider may recline to a substantially horizontal position on the body rest with the rider's feet extending toward the front end of the frame so as to contact the steering foot rests, wherein the road luge is unpowered.

\* \* \* \* \*